Patented June 22, 1943

2,322,242

UNITED STATES PATENT OFFICE 2,322,242

COATING COMPOSITION

Francis W. Lanigan, Belmont, and Jacob G. Mark, Cambridge, Mass., assignors to Dewey and Almy Chemical Company, North Cambridge, Mass., a corporation of Massachusetts No Drawing. Application February 17, 1938, Serial No. 191,028

7 Claims. (Cl. 260—757)

This invention relates to coating compositions for containers and is particularly adapted for the coating of paper board containers for sensitive food products such as milk. It is also useful for the coating of metallic containers such as beer cans.

Among the objects of the invention are: to produce a coating composition which when applied to a container—whether paper or metal—will be impervious; which may be easily applied; which will have suitable spreading characteristics; which will give high economy in pounds of material required in proportion to the number of containers protected; which may be applied to the containers by existing machinery in the approximate temperature range of commercial practice; and, which does not require mechanical reconstruction of existing plant equipment. In consequence, the invention includes an improved composition which has a viscosity so low that containers to be coated with it may be dipped and will drain rapidly without loss of material.

Because of the special adaptability of our coating composition for paper milk bottles, we shall describe the composition and the method of its application using these containers as illustrative examples, but it should be understood that they are non-limitative examples only.

Previous attempts to coat containers made of paper fibre, such as millboard, to render it impervious to liquids and to increase the structural strength so that they may be used as milk bottles, have been successful only to a limited extent. Wax base coatings have been the most successful but they have been subject to certain defects and objections of which the following are the most important: (1) The coating compound is affected by the animal fats contained in the milk and the milk is itself affected by the materials composing the coating compound, an unpleasant taste or odor being imparted in some cases, or certain components which give the natural taste or odor to the milk being extracted by the coating compound; (2) The container lacks durability either because of water absorption through the coating which softens the paper fibre or because re-crystallization of components of the coating takes place and renders the coating brittle; (3) Liquid may permeate to the interior of the paper stock due to loose or projecting fibres which may be said to act as syphons through the coating layer; (4) At refrigeration temperatures the brittleness of the coating becomes so great that the coating is likely to crack if the container is bumped and, thus, to expose the interior of the paper to the action of the liquid. If the container is subjected to elevated temperatures, as in pasteurization, the progressive crystal growth opens up fault planes through which the liquid enters the paper; (5) The coating cannot be applied uniformly over the entire surface without streaks or spots occurring which are believed to be due to absorption of the coating material by the paper leaving the surface unprotected by a continuous coating surface; (6) The coating material penetrates the paper stock to such an extent that the amount of coating material required is prohibitive or uneconomical.

We are aware that compositions have been made from rubber and waxes but these compositions have not been capable of successful use in contact with food materials which are sensitive to absorption or alteration and the physical properties of such compositions have rendered them unsuitable under the conditions herein described. We are also aware that mixtures of rubber and wax have been used for the impregnation of leather and for other purposes, but these compositions have been wholly unsuitable for use with foods and have had a high viscosity which makes it impossible to apply them commercially by dipping.

Altogether, although much time and effort has been spent in the attempt to provide a satisfactory coating compound of the kind in question, no compound, so far as is known to us, has yet been produced which is not subject to a material extent to all of the mentioned objections. Because of the lack of a satisfactory coating compound for paper containers, the introduction of the paper milk bottle as well as the use of paper containers for other purposes has been greatly retarded.

While our invention is capable of employment particularly advantageously in the manufacture of paper containers, the coating embodying our invention has been found to be almost equally useful in connection with metal containers, for instance, as a lining for beer cans. It also makes possible the use of paper containers for oils such as cylinder oils.

We have discovered that when rubber is modified by suitable treatment, and is mutually dispersed with wax in the proper proportions, the resulting product has certain definite characteristics and properties which render it different from the preceding rubber-wax mixtures and make it useful for certain purposes for which the known rubber-wax mixtures were totally unsuitable.

The mutual dispersion of treated rubber and wax described herein has a viscosity so low that it is not substantially different from that of the wax employed and, therefore, it would be expected that it would penetrate porous material such as paper board to the same extent as wax having equal viscosity. It would be expected that the lowering of the viscosity would be accompanied by an increase in penetration. Apparently, the treated rubber has some obscure effect on the dispersions, so that the composition behaves like a new and an altogether different substance and not like wax. Something different from a physical mixture appears to have been created. The result is that, although our composition has a very low viscosity and flows, spreads, and drains rapidly, it forms a thin, unbroken, tough, impervious surface coating without substantial permeation of the paper board. We have also observed that the solubility characteristics of our composition are entirely different from rubber-wax mixtures. For instance, it is resistant to the static action of certain solvents, e. g. benzol in which both of its components are soluble, and it is not readily attacked by oils or fats such as cylinder oils and butterfat. Another characteristic, in which it differs from the waxes, is that it does not absorb certain taste or odor-giving substances, e. g. from ginger ale.

In addition, the film or surface coating is flexible at all temperatures of use, and it adheres strongly to metal such as tinplate.

In the following description, we have described a coating compound particularly adapted for use in the manufacture of paper milk bottles, but this same compound whether identically as described or when modified within the scope of our invention for a particular use, has been found to give most unexpectedly satisfactory results for linings for metal beer and fruit juice cans and for paper cans for cylinder oil.

In carrying out our invention by our preferred process for producing a composition suitable for coating paper milk bottles, we place single layer thicknesses of selected pale crepe rubber upon trays, preferably made of stainless steel, and heat the rubber, holding it at an elevated temperature until a sufficient degree of depolymerization has been reached. Preferably, this is done under oxidizing conditions in ovens heated to 297° F. and provided with exhaust equipment by which the vaporized products are withdrawn. At the end of eighteen hours, the rubber will have been broken down into a clear, translucent, amber mass which is extremely sticky but which, nevertheless, exhibits certain familiar rubber characteristics.

The rubber removed from the trays is dumped into a jacketed type of Werner-Pfleiderer mixer. The steam pressure in the jacket is maintained at five pounds. Then, an equal weight of paraffin (melting point 133°–135° F., Stormer viscosity at 90° C., 6.5 seconds, per 100 revolutions with a 100-gram weight) is slowly added. Working in the Werner-Pfleiderer mixer is continued for about one hour or until a completely clear, homogeneous dispersion is produced. Meanwhile, a large quantity of paraffin has been melted in an ordinary type of jacketed mixing kettle. Fifteen percent of the above rubber-wax dispersion, previously strained through a 40 or 60-mesh screen, is then run into the molten paraffin and the stirring continued until a smooth, clear liquid is obtained. We believe that the depolymerized rubber is not merely dispersed in the wax but that a mutual dispersion of wax and depolymerized rubber has been produced. The process may, of course, be varied by adding the larger amount of paraffin directly to the Werner-Pfleiderer mixer, thus completing the process in a single machine, but manufacturing economies usually require the procedure above described.

The product will be found to have a viscosity of about 11 seconds as measured on a Stormer viscosimeter under the same conditions as above. The difference between this viscosity and that possessed by the base wax (6.5 seconds) is immaterial and, for practical purposes, it may be considered that the viscosities are the same.

For the purposes of this invention, increases in viscosity which do not affect the rate of draining on existing machinery or which do not cause the weight of the deposit to be increased over the weight of the base wax deposited under the same conditions are immaterial and may be disregarded. In the specification and claims we have used the words "immaterial," "immaterial increase," and "approximate viscosity" in this sense.

The composition is run out from the mixing tank into trays where it is allowed to solidify into cakes which are then ready for shipment to the container manufacturer.

The composition is applied to paper containers preferably by dipping and to metal containers, where only the inside is to be coated, preferably by spraying.

The millboard used in paper containers undergoes drastic mechanical working while the container is being formed and, therefore, it is not practical to pre-coat the millboard as, if this is done, the coating is cracked or marred during the mechanical operations and a container made therefrom is defective. Our preferred practice is, therefore, to make the containers from uncoated millboard, to dip them in the molten composition and then invert and allow them to drain.

After such a paper container has been allowed to cool, it will be found that the solidified compound has not penetrated the paper, but that it has formed an exceedingly smooth, brilliant film upon the paper surface. The film is highly adhesive, flexible through wide temperature ranges, and so impervious that the container will show no trace of stain if it be filled with a 3% iodine solution and then torn down and examined for blue spots.

Since the flow characteristics of the material are substantially the same as those of the base wax, the weight of the material deposited under any given machine conditions will be substantially the same, or less than the weight of the base wax which would have been deposited under the same conditions, but, the protective capacity of the coating is far better.

In the above example, paraffin of a specific grade has been chosen as a single example drawn from the wide range of waxes to which this invention applies. We find that when metallic containers are to be coated, it is preferable to use as the base wax one of the many micro-crystalline waxes now available as by-products from the refining of petroleum, since the higher melting range possessed by such a wax better adapts the compound to withstand the pasteurizing temperatures to which canned products, particularly beer, are subjected.

A wide variety of wax-like substances may be employed, the choice of the wax depending considerably upon the use to which the coated container is to be put. Such wax-like substances are hydrocarbon "waxes," such as paraffinic waxes and micro-crystalline waxes; chlorinated naphthalenes; vegetable waxes, such as carnauba; and insect waxes, such as beeswax. Other wax-like substances may be used provided they will form a dispersion with rubber, treated as described, and have the requisite characteristics with respect to taste and odor.

The procedure used in making the metal coating compound is the same as that previously described; the only changes being in the steam pressure used on the Werner-Pfleiderer mixer, and the time of mixing, which are, of course, controlled by the characteristics of the base wax used.

The viscosity of the finished compound will be approximately the same as that possessed by a base micro-crystalline wax at the same temperature.

The particular kind of rubber employed will be chosen with due respect to the use to which the final composition is to be put and the time of treatment may be shortened by increasing the temperature, but it is to be observed that substances imparting objectionable taste may be developed at the higher temperatures, particularly in excess of 300° F.

Metallic (or glass) containers are coated with the compound in the following manner. The containers are first heated to the approximate temperature of the molten compound and then are either filled with the compound or the interiors are drenched with a heavy spray. The containers are then allowed to drain while passing through a chamber maintained at the melting temperature of the compound. They are then reversed and allowed to cool.

We claim:

1. The process for producing a protective coating material which comprises subjecting rubber to prolonged heating in an oxidizing atmosphere and subsequently interdispersing the treated rubber and a molten wax in such mutual proportions that the viscosity of the resulting compound remains approximately that possessed by the wax at the same temperature.

2. The process of producing a coating composition including the steps of subjecting rubber to a depolymerizing treatment and then colloidally dispersing the depolymerized rubber in a wax in such proportions and under such conditions that the resulting compound possesses in its molten state an immaterially increased viscosity over that possessed by the base wax at the same temperature.

3. An odor and taste-free coating composition suitable for coating foodstuff containers comprising a mutual dispersion of wax and a depolymerized rubber, the rubber having been depolymerized before dispersing it with the wax by subjecting it to heat under conditions permitting escape of gaseous products of decomposition, the viscosity of the dispersion being not materially greater than that of the wax at the same temperature.

4. The process of preparing a coating composition comprising subjecting rubber to an elevated temperature for a sufficient period of time to bring about depolymerization of the rubber and then mixing the depolymerized rubber with a wax to form a mutual dispersion of wax and depolymerized rubber.

5. The process of making a coating composition suitable for use with foodstuff containers which comprises heating rubber to depolymerize it and then mixing the depolymerized rubber with a wax to form a mutual dispersion thereof, the relative proportion of the wax and rubber and the degree of depolymerization of the rubber being such that the resulting product has a viscosity not substantially greater than that of the wax at the same temperature.

6. A coating composition comprising a hydrocarbon wax and depolymerized rubber mutually interdispersed therewith, the rubber having been depolymerized before incorporating it with the wax and under conditions permitting escape of gaseous products of decomposition whereby the resulting composition is substantially odor and taste-free.

7. The process of producing a coating composition suitable for use in contact with foodstuffs, which comprises heating rubber until it breaks down into a clear translucent sticky amber-like mass under conditions permitting the escape of vaporized decomposition products and subsequently inter-dispersing the treated rubber and a molten wax in such mutual proportions that the viscosity of the resulting compound remains approximately that of the wax at the same temperature.

FRANCIS W. LANIGAN.
JACOB G. MARK.